United States Patent [19]

Shekleton et al.

[11] Patent Number: 4,901,524
[45] Date of Patent: Feb. 20, 1990

[54] STAGED, COAXIAL, MULTIPLE POINT FUEL INJECTION IN A HOT GAS GENERATOR

[75] Inventors: Jack R. Shekleton, San Diego; Robert W. Smith, Lakeside; Roy W. Vershure, Escondido, all of Calif.

[73] Assignee: Sundstrand Corporation, Rockford, Ill.

[21] Appl. No.: 292,233

[22] Filed: Dec. 30, 1988

Related U.S. Application Data

[63] Continuation-in-part of Ser. No. 272,409, Nov. 17, 1988, which is a continuation-in-part of Ser. No. 123,303, Nov. 20, 1987.

[51] Int. Cl.⁴ .................................................. F23R 3/34
[52] U.S. Cl. ................................. 60/39.465; 60/742; 60/748
[58] Field of Search ............... 50/732, 733, 737, 742, 50/748, 753, 759, 760, 39.465; 431/158, 182, 183, 185, 187, 242, 243

[56] References Cited

U.S. PATENT DOCUMENTS

| | | | |
|---|---|---|---|
| 2,850,875 | 9/1958 | Gahwyler | 60/748 |
| 2,999,359 | 9/1961 | Murray | 60/733 |
| 3,788,067 | 1/1974 | Carlisle et al. | 60/742 |
| 3,937,011 | 2/1976 | Carvel et al. | 60/742 |
| 4,023,351 | 5/1977 | Beyler et al. | 60/742 |
| 4,157,012 | 6/1979 | Du Bell | 60/742 |
| 4,260,367 | 4/1981 | Markowski et al. | 60/732 |
| 4,265,615 | 5/1981 | Lohmann et al. | 60/748 |

Primary Examiner—Louis J. Casaregola
Assistant Examiner—Timothy S. Thorpe
Attorney, Agent, or Firm—Wood, Dalton, Phillips, Mason & Rowe

[57] ABSTRACT

Improved performance in a hot gas generator is achieved by disposing a multiple port fuel injector 42 having three spaced fuel discharge ports 46, 48, 49 on the longitudinal axis 28 of a vessel 18 having a narrow inlet 22, an opposite narrow outlet 14 and an intermediate, enlarged chamber 24 which serves as a combustion chamber.

11 Claims, 1 Drawing Sheet

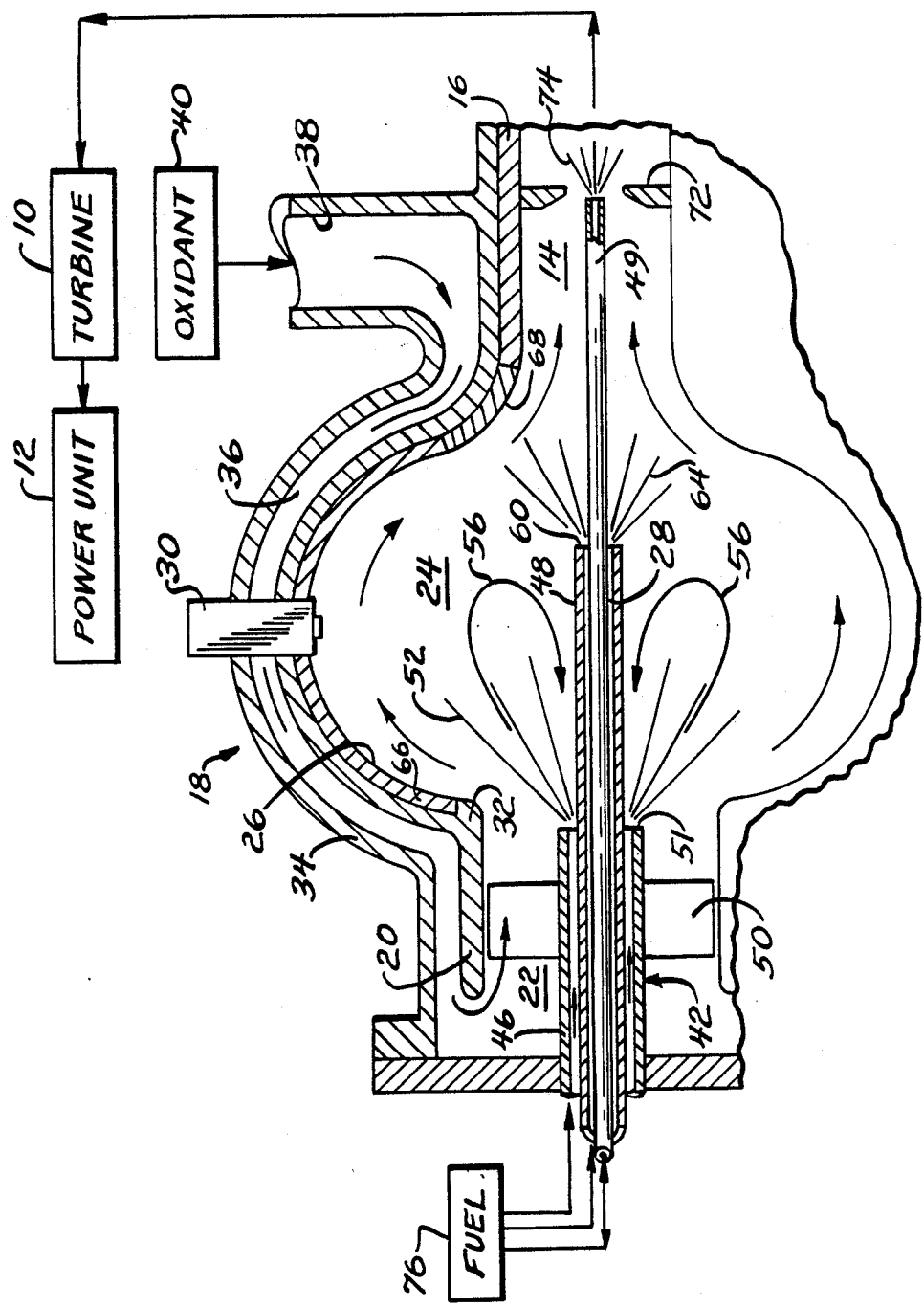

STAGED, COAXIAL, MULTIPLE POINT FUEL INJECTION IN A HOT GAS GENERATOR

CROSS REFERENCE

This application is a continuation-in-part of commonly assigned copending application Ser. No. 272,409 filed Nov. 17, 1988 which in turn is a continuation-in-part of the commonly assigned, copending application Ser. No. 123,303, filed Nov. 20, 1987, now abandoned the details of which are herein incorporated by reference.

FIELD OF THE INVENTION

This invention relates to a generator for producing hot gasses as, for example, might be employed to drive a turbine wheel.

BACKGROUND OF THE INVENTION

Hot gas generators have long been utilized for producing hot gas under pressure to operate engines of various sorts as well as for other purposes. See, for example, U.S. Pat. No. 1,828,784 issued Oct. 27, 1931 to Perrin which constitutes the most pertinent prior art known to the applicant.

In such hot gas generators, a carbonaceous fuel is combusted with an oxidant to produce hot gasses of combustion. In addition, additional fuel may be introduced into the hot gasses of combustion to be vaporized, or partly decomposed, or both, (dependent on gas temperature) as opposed to combusted, to increase the volume of hot gas while bringing the temperature of the gas down to some desired temperature incapable of causing damage to the system in which the generator is used.

One difficulty in the operation and use of such hot gas generators is carbon buildup. Carbon buildup results when the fuel is not completely oxidized and elemental carbon is formed within the combustion chamber of the generator. It may deposit itself at various locations therein, particularly those running at relatively cool temperatures. While carbon buildup can be avoided by providing the generator with an excess of oxidant, this results in excessive consumption of oxidant. As ordinarily there is a plentiful supply of liquid fuel, it is normal practice to run a hot gas generator on the rich side so that all oxidant available for combustion is consumed to minimize the consumption of oxidant; and this raises the potential for carbon buildup.

As pointed out by Perrin in his previously identified U.S. Letters Patent, it is also desirable to cool the combustion chamber to prevent damage thereto by excessive heat from combustion occurring therein. Advantageously, this is accomplished by cooling the combustion chamber with fuel. However, in the Perrin construction, there is the opportunity for excessive cooling of the combustion chamber walls; and the resulting cool spots facilitate carbon buildup when the generator is operated on the rich side as is desired to prevent the existence of hot spots.

Carbon buildup is undesirable because it may interfere with heat transfer. However, another problem resulting from carbon buildup is much more serious. Specifically, such hot gas generators are frequently used to produce hot gasses for driving turbine wheels. As carbon builds up, particles of the same typically break free and then flow with the hot gas through the turbine wheel. Such particulate carbon erodes the turbine nozzles and the turbine wheels. Furthermore, carbon deposits can build up on the surfaces of the turbine nozzles and restrict the flow to cause performance losses.

The hot gas generators disclosed in the referenced copending applications avoid many of these difficulties and are accordingly highly advantageous. Nonetheless, improvements in terms of simplifying the construction, assuring full and complete vaporization of fuel introduced downstream of the main combustion zone, and minimizing the number of obstructions in the gas flow zone are desirable.

The present invention is directed to providing the above improvements.

SUMMARY OF THE INVENTION

It is the principal object of the invention to provide a new and improved hot gas generator. More specifically, it is an object of the invention to provide a hot gas generator that is constructed with a simplified fuel injection nozzle structure. It is also an object of the invention to provide a hot gas generator with provision for enhanced vaporization and thermal cracking of fuel injected into the hot gas generator downstream of the primary combustion zone.

An exemplary embodiment of the invention achieves the first of the above-named objects in a hot gas generator including a vessel with an interior wall having a narrow inlet and an opposite, narrow outlet end. An intermediate, relatively wide, combustion chamber connects the inlet and the outlet and an oxidant inlet port is disposed at the inlet end.

According to one facet of the invention, a first fuel injection port is located adjacent the inlet, a second fuel injection port is within the chamber and upstream of the outlet for injecting fuel onto the interior wall in the vicinity of the outlet, and a third fuel injection port is disposed within the outlet end.

In a highly preferred embodiment, the first, second and third injection ports are defined by concentric tubes.

The invention also contemplates that there be a choke orifice in the outlet adjacent the third port such that the latter injects fuel downstream of such orifice.

In operation, the first injection port injects fuel that is combusted within the chamber. The second injection port injects fuel which is vaporized and may be thermally cracked adjacent the outlet and the third injection port injects fuel which is vaporized.

Other objects and advantages will become apparent from the following specification taken in connection with the accompanying drawing.

DESCRIPTION OF THE DRAWING

The FIG. is a partial schematic, partial sectional view of a hot gas generator made according to the invention along with certain components of a system with which the hot gas generator is adapted to be used.

DESCRIPTION OF THE PREFERRED EMBODIMENT

An exemplary embodiment of a hot gas generator made according to the invention is illustrated in the FIG. in the environment of a turbine system including a turbine 10 for driving a power unit 12 such as a typical "emergency power unit" which may be in the form of an electrical generator, a hydraulic pump, a combination thereof, etc. The turbine 10 is driven with hot gas from an elongated outlet 14 located at one end 16 of a vessel, generally designated 18. The opposite end 20 of the vessel 18 has an inlet 22 which is spaced from the outlet 14 by an intermediate, enlarged, combustion chamber 24. That is to say, the enlarged, intermediate combustion chamber 24 interconnects a narrow inlet 22 and a narrow outlet 14. Stated another way, the vessel 18 includes an interior surface 26, which typically will be a surface of revolution about an axis 28, that first progressively widens and then progressively narrows as the outlet 14 is approached from the inlet 22. Preferably the inner surface 26 of the chamber 24 is spherical.

A high energy ignition device 30 may extend into the chamber 24.

Desirably, the vessel 18 includes an inner wall 32 having the inner surface 26 which defines the confines of the combustion chamber 24 and a spaced, outer shell or wall 34. In this regard, the igniter 30 may serve as one of several radial support elements (those other than the igniter 30 are not shown) which serve to locate the inner wall 32 with respect to the outer shell 34. Between the two is a duct 36 which extends from an oxidant inlet 38 connected to a supply of oxidant 40 and about the chamber 24 to the inlet 22. Thus, the oxidant sustaining combustion within the chamber 24 serves to cool the wall 32 as it flows from the oxidant inlet 38 to the inlet 22 to the combustion chamber 24. In a preferred embodiment, the oxidant entering the inlet 38 will already be in the gaseous phase for at low combustion rates, the relatively low flow rate of a liquid phase oxidant (or fuel used for cooling) would allow the same to boil within the duct 36. This in turn makes the flow rate difficult to control and causes other problems as well. If desired, turbulators such as trip strips (not shown) may be disposed on either or both interior surfaces of the duct 36 to enhance cooling.

The inlet 22, as will appreciated from the foregoing discussion, serves an an oxidant inlet to the combustion chamber 24. In addition, a fuel injector, generally designated 42, extends into the chamber 24 through the inlet 22. The fuel injector 42 is disposed on the axis 28 and its radially outer periphery is located radially inwardly of the periphery of the inlet 22 so that an oxidant inlet port is effectively defined by the annular space between the fuel injector 42 and the interior wall 26 at the inlet 22. The fuel injector 42 is comprised of three concentric tubes or conduits 46, 48 and 49. The tube 46 is the outermost tube and has a shorter length within the vessel 18 than the length of the tube 48 which, in turn, is located within the tube 46. In addition, swirler blades or vanes 50 are mounted, as by brazing on the tube 46 so as to be located in the inlet 22 and impart a high degree of swirl to oxidant as it enters the chamber 24.

The outermost tube 46 terminates at an end 51 adjacent the inlet 22 to the chamber 24. By any suitable means known in the art, the end 48 is adapted to inject a cone-like spray 52 of fuel into the combustion chamber to combust with the oxidant. Much of the resulting hot gas will flow to the outlet 14 but a recirculating pattern illustrated by arrows 56 to provide stabilized combustion within the chamber 24 will occur.

The tube 48 extends a majority of the way through the chamber 24 to terminate in an end 60 adjacent the outlet 14. The end 60 is in the progressively narrowing part of the chamber 24 and also forms a conelike spray 64 of fuel which impinges against the inner wall 26 adjacent the outlet 14. The spray can be formed by any various means known in the art.

Generally, the interior surface 26 will be defined by a heat shield 66 extending about the chamber. In the vicinity whereat the spray 64 impinges on the wall 26, a heat shield insert 68 capable of withstanding the thermal shock that may be imparted thereto by being subjected to the hot gases approaching 4,000° F. while at the same time having much cooler fuel impinging upon it, may be located.

A third tube 49 is concentric with the tubes 46 and 48, and within the latter, and extends all the way through the chamber 24 and well into the elongated outlet 14. Also disposed within the outlet is a choke orifice 72 and the end 74 of the tube 49 serves as a third fuel injection port which injects fuel at a location downstream of the choke orifice 72.

Finally, a source of fuel 76 is provided whereby fuel may be directed to the interior of the tubes 46, 48 and 70 as desired.

The just described structure has a number of advantages. For one, the fuel injector 42 is a unitary structure, preferably, although not necessarily including the swirler vanes 50. The injector 42 may be easily removed for servicing and just as easily reinstalled. Moreover, because the tube 48 is located centrally of a toroidal shaped recirculation zone, it does not interfere with the outflow of hot gases through the outlet 14. At the same time, the relatively high fuel flow through the tubes 48 and 49 assure that the same will not overheat. In fact, in some instances, it may be desirable to place a thermal barrier coating on the exterior of the tube 48 and/or 49 that will run at a relatively hot temperature to avoid any possibility of carbon buildup.

The spraying of the fuel in the cone 64 upon the interior wall 26 also provides advantages. In particular, if the spray were strictly into the outgoing flow of gas, the fuel droplets would be quickly accelerated up to the speed of the flowing gas. When that speed is attained, there is no relative movement between the gas and the fuel droplets with the consequence that there is little, if any, heat transfer. Less than full vaporization may occur which is undesirable for any of a variety of reasons.

However, by taking advantage of the feature of the invention whereby the fuel is sprayed in a spray 64 upon the interior wall 26, the fuel tends to stick to the wall as a film and is dragged along the wall by the outflowing gas. This, of course, prolongs the relative movement that occurs between the fuel droplets and/or film and the gas thereby maximizing heat transfer to assure full and complete vaporization.

This factor, coupled with a mode of operation such that the wall or inner surface 26 of the combustion chamber 24 is run relatively hot, inhibits carbon build up. In addition, and even more importantly, it is desirable to operate at an air/fuel mass ratio that is not less than about 12 to 1 inside the chamber 24. A high carbon to hydrogen ratio fuel such as diesel fuel could have a somewhat higher air/fuel ratio whereas a low carbon to hydrogen ratio fuel such as JP4 could have a somewhat lower air/fuel ratio in those cases where air is the oxidant.

Significantly, it is important to operate with a stoichiometric excess of fuel if oxidant use is to be minimized. This is particularly true where low turbine inlet gas temperatures are employed. Such relatively low turbine inlet gas temperatures are those below 1650 F. In such a case, the oxidant would be incompletely consumed. Conceivably, an additional stage of air injection might be employed in connection with the tube 46 but would be avoided with the tube 48.

In a typical case, the temperature within the primary combustion zone which is provided with fuel through the tube 46 will be on the order of 4000° F. and at a pressure on the order of 250-300 PSI. Typically, in the region adjacent the discharge port on the tube 48, temperatures on the order of 2000° F. will be encountered. In such a case, the fuel will be thermally cracked as well as vaporized. The increased volume as a result of vaporization obviously is desirable in terms of providing sufficient volume of hot gas to the turbine 10 to drive the same. However, the effect of thermal cracking is also significant. In particular, fuels of the type that are typically combusted in a hot gas generator of the sort of concern will typically have at least seven carbon atoms. When cracked, one molecule of fuel will become at least two molecules of simpler carbon based compounds. The two or more molecules of the cracked compound occupy a significantly greater volume than the single molecule from which they were formed thus providing a further volume enhancing feature in the invention.

The ability to operate at such a thermal cracking temperature in the vicinity whereat secondary fuel injection occurs is accomplished in part through the use of the choke orifice 72 which can be sized to control flow through the outlet 14 at temperatures and pressure suitable for application to the particular turbine 10 of concern. Typically, on the downstream side of the choke orifice 72, temperatures on the order of 1200-1600° F. will be present. This temperature is sufficient to vaporize fuel leaving the end 74 of the tube 49 for further volume enhancement.

In one embodiment of the invention, for each one part of fuel injected from the tube 46, approximately three parts are injected through the tube 48 and eight parts through the tube 49. Because the choke orifice 72 limits the pressure downstream thereof in the outlet 14, it will be appreciated that approximately ⅔ of the total fuel injected is being injected into a zone of relatively low pressure with the consequence that pump size and pumping energy requirements are minimized.

Advantageously, because the system encourages thermal cracking, the generation of black smoke and carbon build-up are minimized. At the same time, the invention allows operation at temperatures sufficiently high that the condensation of fuel, and the resulting white smoke that would be generated thereby, can likewise be avoided.

We claim:

1. A hot gas generator comprising:
a vessel with an interior wall and having a narrow inlet end, an opposite, narrow elongated outlet end, and an intermediate, relatively wide, combustion chamber interconnecting said inlet end and said outlet end;
an oxidant inlet port at said inlet end; and
a fuel injector disposed generally centrally within said oxidant port and extending thru said chamber generally centrally thereof, said fuel injector having a first fuel discharge port at said inlet end for directing fuel toward said combustion chamber, a second fuel discharge port near said outlet end for directing fuel toward said outlet end, and a third fuel discharge port within said outlet end.

2. The hot gas generator of claim 1 wherein said vessel has a longitudinal axis extending through said chamber between said ends and said injector is disposed substantially on said axis; said oxidant port being concentric with said axis.

3. The hot gas generator of claim 1 wherein said injector comprises first, second and third concentric conduits terminating in respective ones of said fuel discharge ports.

4. The hot gas generator of claim 1 further including a choke orifice in said outlet adjacent said third port.

5. A hot gas generator comprising:
a vessel with an interior wall and having a narrow inlet end, an opposite, narrow outlet end, and an intermediate, relatively wide, generally spherical combustion chamber interconnecting said inlet end and said outlet end;
an oxidant inlet port at said inlet end;
a first fuel injection port adjacent said inlet;
a second fuel injection port within said chamber and upstream of said outlet end for injecting fuel onto said interior wall in the vicinity of said outlet end; and
a third fuel injection port within said outlet end.

6. The hot gas generator of claim 5 wherein said first, second and third injection ports are defined by concentric tubes.

7. The hot gas generator of claim 5 further including a choke orifice in said outlet adjacent said third port.

8. A hot gas generator comprising:
a vessel having a spaced inlet and outlet and an interior surface extending therebetween and first progressively widening about a central axis and then progressively narrowing about said axis as the outlet is approached from the inlet, said inlet and said outlet being located on said axis, said outlet being elongated,
a oxidant supply conduit connected to said inlet; at least three concentric tubes located on said axis and extending into said inlet in radially inwardly spaced relation thereto, the outermost one of said tubes having a lesser length within said vessel and terminating in a first fuel injection port adjacent said inlet for directing fuel into the progressively widening part of said vessel interior surface, another tube within said outermost tube extending well into said vessel and terminating at the progressively narrowing part of said vessel interior surface in a second fuel injection port for injecting fuel in the vicinity of said outlet, a third of said tubes extending into said outlet and including a third fuel injection port for injecting fuel into said outlet; and
a source of fuel connected to said tubes.

9. The hot gas generator of claim 8 wherein said second fuel injection port injects fuel onto said interior wall.

10. The hot gas generator of claim 8 wherein said outlet includes a choke orifice and said third fuel injection port injects downstream of said orifice 11. The hot gas generator of claim 8 wherein said vessel interior surface is generally spherically shaped.

* * * * *